(12) United States Patent
Fan et al.

(10) Patent No.: US 9,052,563 B2
(45) Date of Patent: Jun. 9, 2015

(54) DISPLAY DEVICE AND DISPLAY SYSTEM

(75) Inventors: Shou-Shan Fan, Beijing (CN); Liang Liu, Beijing (CN); Yu-Quan Wang, Beijing (CN); Li Qian, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 259 days.

(21) Appl. No.: 13/337,305

(22) Filed: Dec. 27, 2011

(65) Prior Publication Data

US 2013/0050136 A1  Feb. 28, 2013

(30) Foreign Application Priority Data

Aug. 31, 2011  (CN) .......................... 2011 1 0255049

(51) Int. Cl.
*G06F 3/045* (2006.01)
*G02F 1/167* (2006.01)

(52) U.S. Cl.
CPC ...................................... *G02F 1/167* (2013.01)

(58) Field of Classification Search
CPC . G06F 3/044; G09G 3/3696; H04M 2250/22; H04M 1/0266; H04M 1/0214; H04M 1/0268; G02F 1/167; G02F 1/13338
See application file for complete search history.

(56) References Cited

U.S. PATENT DOCUMENTS

| | | | |
|---|---|---|---|
| 2009/0167707 A1* | 7/2009 | Jiang et al. | 345/173 |
| 2010/0048254 A1* | 2/2010 | Jiang et al. | 455/566 |
| 2010/0283762 A1* | 11/2010 | Takusa | 345/174 |
| 2011/0039603 A1 | 2/2011 | Kim et al. | |
| 2011/0115727 A1 | 5/2011 | Feng et al. | |
| 2011/0285343 A1* | 11/2011 | Weng | 320/107 |
| 2012/0007814 A1 | 1/2012 | Tung | |
| 2012/0236392 A1* | 9/2012 | Shih et al. | 359/296 |
| 2012/0320001 A1* | 12/2012 | Gila et al. | 345/204 |

FOREIGN PATENT DOCUMENTS

| | | |
|---|---|---|
| CN | 101154008 | 4/2008 |
| CN | 101533321 | 9/2009 |
| CN | 101751167 | 6/2010 |
| CN | 101997976 | 3/2011 |
| TW | M394531 | 12/2010 |
| TW | 201124898 | 7/2011 |

\* cited by examiner

*Primary Examiner* — Gerald Johnson
(74) *Attorney, Agent, or Firm* — Novak Druce Connolly Bove + Quigg LLP

(57) ABSTRACT

A display device includes an e-paper, a touch panel, and an external data interface. The e-paper has a display surface. The touch panel is located on the display surface of the e-paper. The touch panel is configured to control the e-paper. The data interface is configured to electrically connect the e-paper and the touch panel to an electric device. The e-paper and the touch panel include a plurality of processing units and control units integrated in the electric device. The present disclosure also relates to a display system using the display device.

15 Claims, 3 Drawing Sheets

DISPLAY DEVICE AND DISPLAY SYSTEM

CROSS-REFERENCE TO RELATED APPLICATIONS

This application claims all benefits accruing under 35 U.S.C. §119 from China Patent Application No. 201110255049.8, filed on Aug. 31, 2011 in the China Intellectual Property Office, the disclosure of which is incorporated herein by reference.

BACKGROUND

1. Technical Field

The present disclosure relates to a display device and a display system.

2. Description of Related Art

With the development of the touch technology, there is a continuous growth in the number of portable electronic apparatuses (e.g., a mobile phone) equipped with optically transparent touch panels at the front of their respective display screens. Users can operate such portable electronic apparatuses by pressing or touching the touch panel with a finger, a pen, or a stylus, while visually observing the display device through the touch panel.

On one hand, the display screens of the portable electronic apparatuses are relatively small, therefore, the visual effect of the display screens can be influenced. On the other hand, if the portable electronic apparatuses having large display screens are prepared, because control units, processing units, and other chips of the portable electronic apparatuses are integrated with the large display screens together, the volume and the weight of the portable electronic apparatuses will be increased. Furthermore, because the control units, processing units, and other chips of the portable electronic apparatuses are made of non-flexible material, the portable electronic apparatuses are stiff and cannot be bended.

What is needed, therefore, is to provide a display device and a display system, which can overcome the above-described shortcomings.

BRIEF DESCRIPTION OF THE DRAWINGS

Many aspects of the embodiments can be better understood with reference to the following drawings. The components in the drawings are not necessarily to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
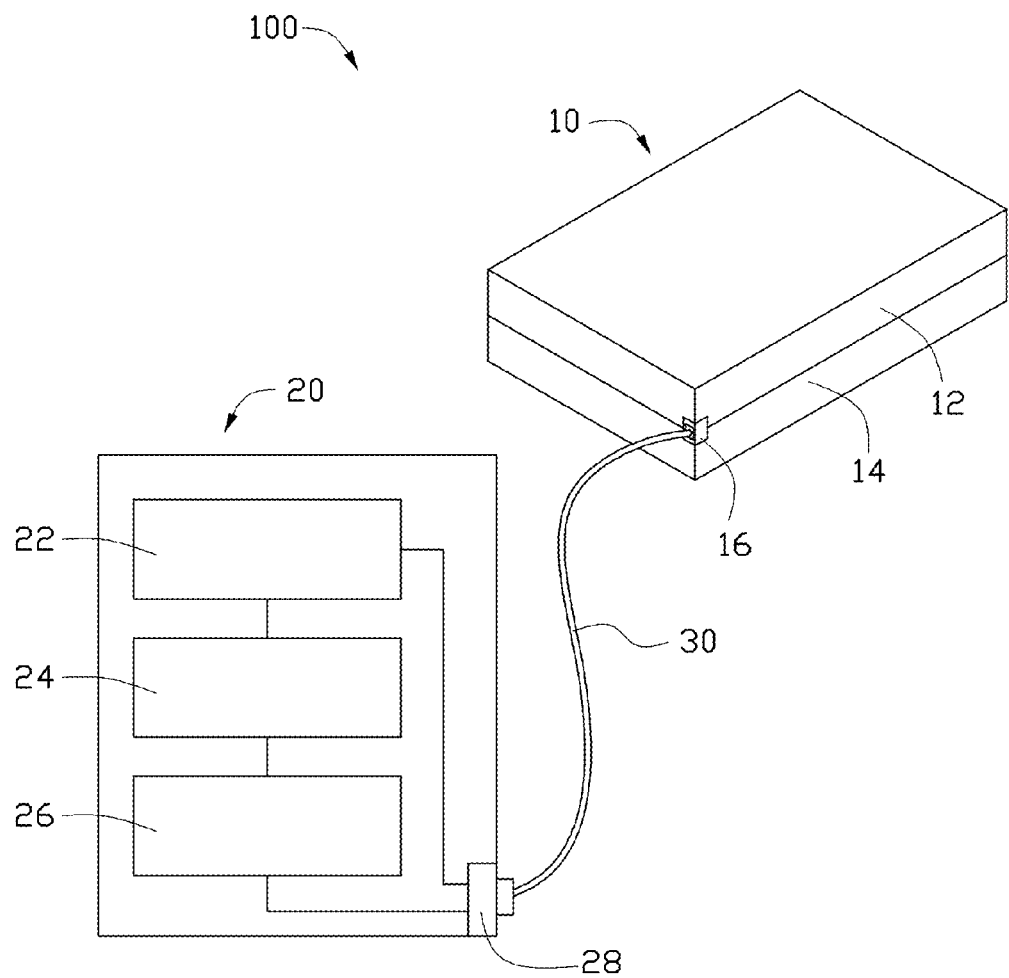
FIG. 1 is a schematic view of one embodiment of display system.

Referring to FIG. 1, a display system 100 according to one embodiment is provided. The display system 100 includes a display device 10 and an electronic device 20. The display device 10 can be electrically connected to the electronic device 20 via an external data line 30.

The display device 10 includes an electronic paper 14 (e-paper), a touch panel 12, and a data interface 16. In one embodiment, the display device 10 consists of an electronic paper 14 (e-paper), a touch panel 12, and a data interface 16. The e-paper 14 and the touch panel 12 are stacked on each other to form a layer structure. The e-paper 14 and the touch panel 12 are electrically connected to the electronic device 20 respectively. The e-paper 14 includes a display surface (not labeled). The touch panel 12 is located on the display surface of the e-paper 14. The data interface 16 is located on a side of the display device 10. The data interface 16 can be used to electrically connect the display device 10 to the electronic device 20. Controller units, processing units, and power supply units of the e-paper 14 and the touch panel 12 are integrated in the electric device 20.

The electronic device 20 can be a mobile phone, a PDA, an MP5, a mobile hard disk, a computer, a digital photo frame, a GPS navigation equipment, an electronic dictionary, a server, or other portable electronic apparatuses. In one embodiment, the electronic device 20 is a mobile phone. The electronic device 20, including basic structures and control units of the portable electronic apparatus, can be used alone without the display device 10. The electronic device 20 further includes a first controller 22, a central processing unit 24, a second controller 26, and a data interface 28. The first controller 22, the central processing unit 24, and the second controller 26 are electrically connected with each other. The first controller 22, the central processing unit 24, and the second controller 26 are incorporated in the electronic device 20. The data interface 28 is located on a side of the electronic device 20.

The display device 10 and the electronic device 20 are electrically connected with each other by the external data line 30. Specifically, the first controller 22 and the touch panel 12 are electrically connected with each other by the external data line 30. The second controller 26 and the e-paper 14 are electrically connected with each other by the external data line 30.

Figure 2:
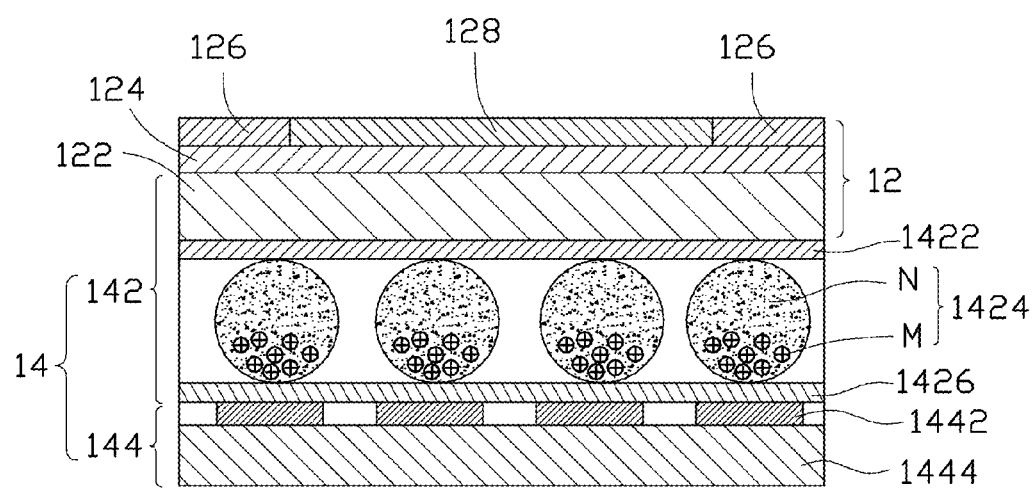
FIG. 2 is a cross-sectional schematic view of a display device of FIG. 1 along line II-II.

The touch panel 12 can be a capacitance touch panel, or a resistance touch panel. Referring to FIG. 2, in one embodiment, the touch panel 12 is a surface capacitance touch panel. The touch panel 12 includes a first transparent substrate 122, a transparent conductive layer 124, a plurality of electrodes 126, and a passivation layer 128.

The first transparent substrate 122 is located on the display surface of the e-paper 14. The first transparent substrate 122 can have a curve surface or a plane surface. Materials of the first transparent substrate 122 can be made of insulative inflexible material or insulative flexible material. The insulative inflexible material can be glass or quartz. The insulative flexible material can be plastics or resins. More specifically, the insulative flexible material can be polycarbonate (PC), polymethyl methacrylate (PMMA), polyethylene terephthalate (PET), polyether sulfone (PES), polyimide (PI), cellulose esters, benzocyclobutene (BCB), polyvinyl chloride (PVC), or acrylic resin. In one embodiment, the first transparent substrate 122 is a polyethylene terephthalate film.

The transparent conductive layer 124 is located on a surface of the first transparent substrate 122 away from the e-paper 14. The transparent conductive layer 124 can be a conductive polymer layer, an ITO layer, or a transparent carbon nanotube layer. In one embodiment, the transparent conductive layer 124 includes a transparent carbon nanotube layer. Because the carbon nanotubes have excellent mechanical properties and can be bent, the transparent conductive layer 124 including a transparent carbon nanotube layer can have excellent flexibility and mechanical strength.

Figure 3:
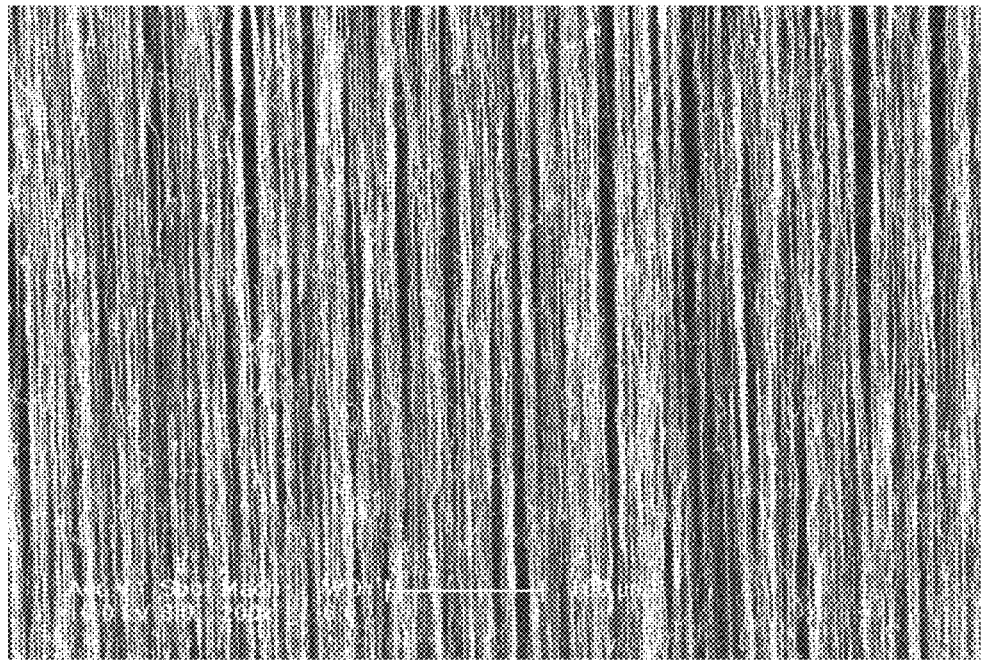
FIG. 3 is a Scanning Electron Microscope (SEM) image of a drawn carbon nanotube film.

The transparent carbon nanotube layer can include at least one carbon nanotube film. The transparent carbon nanotube layer can be formed by a plurality of coplanar or stacked carbon nanotube films. Referring to FIG. 3, the carbon nanotube film can be a drawn carbon nanotube film formed by drawing a film from a carbon nanotube array. Examples of the drawn carbon nanotube film are taught by U.S. Pat. No. 7,045,108 to Jiang et al, the teachings of which are incorporated by reference. The thickness of the drawn carbon nanotube film can be in a range from about 0.5 nm to about 100 micrometers.

The drawn carbon nanotube film includes a plurality of carbon nanotubes that is arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals force, to form a free-standing film. The term 'free-standing' includes films that do not have to be supported by a substrate. A small number of the carbon nanotubes are randomly arranged in the drawn carbon nanotube film, and has a small if not negligible effect on the larger number of the carbon nanotubes in the drawn carbon nanotube film arranged substantially along the same direction. It can be appreciated that some variation can occur in the orientation of the carbon nanotubes in the drawn carbon nanotube film. Microscopically, the carbon nanotubes oriented substantially along the same direction may not be perfectly aligned in a straight line, and some curve portions may exist. It can be understood that contact between some carbon nanotubes located substantially side by side and oriented along the same direction cannot be totally excluded.

More specifically, the drawn carbon nanotube film can include a plurality of successively oriented carbon nanotube segments joined end-to-end by van der Waals force therebetween. Each carbon nanotube segment includes a plurality of carbon nanotubes substantially parallel to each other, and joined by van der Waals force therebetween. The carbon nanotube segments can vary in width, thickness, uniformity and shape. The carbon nanotubes in the drawn carbon nanotube film are also substantially oriented along a preferred orientation.

The plurality of electrodes 126 is located separately, on a surface of the transparent conductive layer 124. A material of the plurality of electrodes 126 can be metal. In one embodiment, the material of the plurality of electrodes 126 comprises silver. The plurality of electrodes 126 can be formed on the corners of the transparent conductive layer 124 by method of sputtering, electro-plating, screen printing, or chemical plating. Alternatively, conductive adhesive, e.g., silver glue, can be used to adhere the plurality of electrodes 126 to the transparent conductive layer 124. An end of the electrode 126 is electrically connected to the transparent conductive layer 124. The other end of the electrode 126 is electrically connected to the data interface 16 by circuits. Therefore, the transparent conductive layer 124 can be electrically connected to the first controller 22 by the plurality of electrodes 126, the data interface 16, the external data line 30, and the data interface 28. In one embodiment, the touch panel 12 includes four electrodes 126 located, separately, on the corners of the surface of the transparent conductive layer 124.

The passivation layer 128 is located on a surface of the transparent conductive layer 124 away from the e-paper 14. The passivation layer 128 can be used to protect the transparent conductive layer 124. Materials of the passivation layer 128 can be silicon nitride, silicon oxide, styrene-cyclobutene (BCB), polyester, polyethylene terephthalate (PET), acrylic resin, or other materials. In one embodiment, the passivation layer 128 is a PET film.

The e-paper 14 can be a microcapsule e-paper, a micro-cup e-paper or an electronic powder fluid e-paper. In one embodiment, the e-paper 14 is a microcapsule e-paper. The e-paper 14 includes a display screen 142 and a driving substrate 144.

The display screen 142 includes a first transparent substrate 122, a counter electrode 1422, a plurality of microcapsules 1424, and a second substrate 1426. The display screen 142 and the touch panel 12 share the same first transparent substrate 122. The second substrate 1426 is opposite to the first transparent substrate 122. The counter electrode 1422 is located on a surface of the first transparent substrate 122 adjacent to the second substrate 1426. The counter electrode 1422 can be electrically connected to the data interface 16 by circuits. Therefore, the counter electrode 1422 can be electrically connected to second controller 26 by the data interface 16, the external data line 30, and the data interface 28. The plurality of microcapsules 1424 is located between the first transparent substrate 122 and the second substrate 1426. The plurality of microcapsules 1424 can be spaced with or contact with each other. In one embodiment, the plurality of microcapsules 1424 is spaced with each other. Each of the microcapsules 1424 includes a plurality of charged pigment particles M and a solution N.

The driving substrate 144 is located on a surface of the second substrate 1426, away from the plurality of microcapsules 1424. The driving substrate 144 includes a plurality of pixel electrodes 1442 and a third substrate 1444. The third substrate 1444 is opposite to the second substrate 1426. The plurality of pixel electrodes 1442 is located on the surface of the second substrate 1426 away from the plurality of microcapsules 1424. In other words, the plurality of pixel electrodes 1442 is located between the second substrate 1426 and the third substrate 1444. The plurality of pixel electrodes 1442 can be electrically connected to the data interface 16 by circuits. Therefore, the plurality of pixel electrodes 1442 can be electrically connected to the second controller 26 by the data interface 16, the external data line 30, and the data interface 28. Each of the plurality of pixel electrodes 1442 is aligned with a corresponding microcapsule 1424 or a plurality of microcapsules 1424. In one embodiment, Each of the plurality of pixel electrodes 1442 is aligned with a corresponding microcapsule 1424.

A material of the second substrate 1426 and the third substrate 1444 can be insulative rigid material or an insulative flexible material. In one embodiment, the second substrate 1426 and the third substrate 1444 are flexible PET plates.

In use of the display system 100, a first end of the external data line 30 is inserted into the data interface 16, and a second end of the external data line 30 is inserted into the data interface 28. Therefore, the touch panel 12 and the e-paper can be electrically connected to the first controller 22 and second controller 26 respectively. Then, a driving signal is applied to the touch panel 12 by the first controller 22. When a user operates the display system 100 by contacting the transparent conductive layer 124 of touch panel 12 with a touching object, such as a finger, a pen, or a stylus, a sensing signal is formed between the touching object and the transparent conductive layer 124. The sensing signal is sent back to the first controller 22. A coordinate information of the touching point can be checked by the first controller 22 according to the sensing signals, and further transmitted to the central processing unit 24. Information data or image data is obtained by the central processing unit 24 according to the coordinate information. The information data or the image data is further transmitted to the second controller 26. Finally, the second controller 26 can control the e-paper 14 to display the information data or the image data on the e-paper 14.

When the display system 100 includes a plurality of display devices 10, the plurality of display devices 10 can be electrically connected to the electronic device 20 by the external data lines 30 respectively. For example, when the electronic device 20 is a server, the server can include a plurality of interfaces. The plurality of display devices 10 can be electrically connected to the server by an external data line 30 respectively. Therefore, a plurality of users can share a same display picture in different places at the same time. Furthermore, different users can control their own display pictures by their own display devices 10.

The display system 100 has the following advantages. First, the control units and processing units of the touch panel and the e-paper are integrated into the electronic device, and the volume and the weigh of the display device can be significantly reduced. Second, the e-paper is lightweight and thin, and thus, the e-paper can be used to develop a large display device with the same characteristics. Third, the touch panel and the e-paper share the same transparent substrate. Thus, the volume and the weigh of the display device can be further reduced, and the display quality of the display device can be improved. Fourth, the touch panel and the e-paper can be made of flexible materials; therefore, the display device can be flexible.

The above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A display device comprising:
an e-paper having a display surface;
a touch panel located on the display surface of the e-paper and controlling the e-paper; and
a data interface configured to electrically connect the display device to an electric device, wherein the e-paper and the touch panel comprise a plurality of processing units and control units integrated in the electric device, each of the e-paper and the touch panel comprise a transparent substrate, and the e-paper and the touch panel share the same transparent substrate.

2. The display device as claimed in claim 1, wherein the transparent substrate comprises a material that is selected from the group consisting of glass, quartz, plastics, and resins.

3. The display device as claimed in claim 1, wherein the transparent substrate comprises a material that is selected from the group consisting of polycarbonate, polymethyl methacrylate, polyethylene terephthalate, polyether sulfone, polyimide, cellulose esters, benzocyclobutene, polyvinyl chloride, and acrylic resins.

4. The display device as claimed in claim 1, wherein the touch panel comprises at least a transparent conductive layer, and the transparent conductive layer comprises a transparent carbon nanotube layer.

5. The display device as claimed in claim 4, wherein the transparent carbon nanotube layer comprises at least one carbon nanotube film, and the at least one carbon nanotube film comprises a plurality of carbon nanotubes joined end to end by van der Waals attractive force and approximately arranged along a same direction.

6. The display device as claimed in claim 5, wherein the at least one carbon nanotube film is a free-standing structure.

7. The display device as claimed in claim 1, wherein the e-paper and the touch panel comprise power supply units integrated in the electric device.

8. A display system comprising:
at least one display device, the at least one display device comprising an e-paper, a touch panel, and a first data interface, wherein the e-paper has a display surface, the touch panel is located on the display surface of the touch panel and is configured to control the e-paper, wherein each of the e-paper and the touch panel comprise a transparent substrate, and the e-paper and the touch panel share the same transparent substrate;
an electric device, the electric device comprising a first controller, a central processing unit, a second controller, and at least one second data interface, wherein the first controller, the central processing unit, and the second controller are electrically connected with each other; and
at least one external data line, wherein an end of the at least one external data line is inserted into the first data interface, and a second end of the at least one external data line is inserted into the at least one second data interface, to make the e-paper and the touch panel electrically connected with the first controller and the second controller respectively.

9. The display system as claimed in claim 8, wherein the at least one display device is a flexible display device.

10. The display system as claimed in claim 8, wherein the first controller, the central processing unit, and the second controller are integrated into the electric device together.

11. The display system as claimed in claim 8, wherein the electric device is a mobile phone, a PDA, an MP5, a mobile hard disk, a computer, a digital photo frame, a GPS navigation equipment, an electronic dictionary, or a server.

12. The display system as claimed in claim 8, wherein the e-paper is a microcapsule e-paper, a micro-cup e-paper or an electronic powder fluid e-paper.

13. The display system as claimed in claim 8, wherein the touch panel is a capacitance touch panel.

14. The display system as claimed in claim 8, wherein the touch panel comprises at least one transparent conductive layer comprising a transparent carbon nanotube layer.

15. The display system as claimed in claim 14, wherein the transparent carbon nanotube layer comprises at least one carbon nanotube film, the at least one carbon nanotube film comprises a plurality of carbon nanotubes joined end to end by van der Waals attractive force and approximately arranged along a same direction.

* * * * *